(12) United States Patent
Numata

(10) Patent No.: US 7,245,907 B1
(45) Date of Patent: Jul. 17, 2007

(54) MOBILE COMMUNICATION TERMINAL REMOTE CONTROL SYSTEM, MOBILE COMMUNICATION TERMINAL, REMOTE CONTROL METHOD, AND REMOTE CONTROL PROGRAM

(75) Inventor: Ryoichi Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 10/408,247

(22) Filed: Apr. 8, 2003

(30) Foreign Application Priority Data

Apr. 9, 2002 (JP) .............................. 2002-107203

(51) Int. Cl.
*H04M 3/00* (2006.01)
(52) U.S. Cl. ........................................ 455/419; 455/420
(58) Field of Classification Search ................ 455/410, 455/411, 456.2, 558, 419, 420
See application file for complete search history.

(56) References Cited

U.S. PATENT DOCUMENTS

| | | | | |
|---|---|---|---|---|
| 4,639,726 | A | * | 1/1987 | Ichikawa et al. ........... 340/7.41 |
| 5,862,472 | A | * | 1/1999 | Park ............................ 455/411 |
| 5,978,668 | A | * | 11/1999 | Maeda et al. ................ 455/410 |
| 6,081,704 | A | * | 6/2000 | Oshima ....................... 455/410 |
| 6,741,851 | B1 | * | 5/2004 | Lee et al. .................... 455/410 |
| 6,771,954 | B1 | * | 8/2004 | Yoneyama et al. .......... 455/420 |
| 6,782,251 | B2 | * | 8/2004 | Kagay, Jr. ................... 455/410 |

FOREIGN PATENT DOCUMENTS

| | | |
|---|---|---|
| EP | 1 220 556 A1 | 7/2002 |
| GB | 2 318 707 A | 4/1998 |
| GB | 2 339 995 A | 2/2000 |
| GB | 2 379 583 A | 3/2003 |
| GB | 2 380 356 A | 4/2003 |
| JP | 10-126495 A | 5/1998 |
| JP | 11-206030 A | 7/1999 |
| JP | 2001-313980 A | 11/2001 |
| JP | 2002-41102 A | 2/2002 |
| JP | 2002-57745 A | 2/2002 |
| JP | 2002-77319 A | 3/2002 |
| JP | 2002-78001 A | 3/2002 |
| JP | 2002-176490 A | 6/2002 |

* cited by examiner

*Primary Examiner*—Bing Q. Bui
(74) *Attorney, Agent, or Firm*—Sughrue Mion, PLLC

(57) ABSTRACT

In the mobile communication terminal remote control system, when the control unit of a mobile communication terminal judges that remote control data sent from a remote control device such as a portable telephone or a personal computer is consistent with remote control data previously stored in a first storage part of the mobile communication terminal, desired information to be concealed which is stored in a second storage part of the mobile communication terminal is masked. Therefore, the desired information to be concealed is protected under remote control. This remote control is performed through a mail transmission/reception function provided as a standard function on the mobile communication terminal such as a portable telephone.

29 Claims, 3 Drawing Sheets

MOBILE COMMUNICATION TERMINAL REMOTE CONTROL SYSTEM, MOBILE COMMUNICATION TERMINAL, REMOTE CONTROL METHOD, AND REMOTE CONTROL PROGRAM

BACKGROUND OF THE INVENTION

1. Field of the Invention

The invention relates to a mobile communication terminal remote control system, a mobile communication terminal, a remote control method, and a remote control program. More particularly, the invention relates to a mobile communication terminal remote control system, a mobile communication terminal, a remote control method, and a remote control program, which are suitable for use, for example, in the case where personal data and the like of a user are stored in a mobile communication terminal, and enable personal data, which the user of the mobile communication terminal desires to conceal, to be masked under remote control, for example, upon the loss or stealing of the mobile communication terminal.

2. Description of the Related Art

In mobile communication terminals such as portable telephones (cellular phones) and PHS (personal handyphone system), an increase in functions has led to an increasing tendency toward storage of important personal data of a user, for example, received mails and telephone directory and mail address data prepared by the user, in his or her own mobile communication terminal.

As shown, for example, in FIG. 1, this type of conventional portable telephone comprises an antenna 1, a transmission/reception part 2, a control unit 3, an operating part 4, a transmission part (a microphone) 5, a reception part (a speaker) 6, ROM (read only memory) 7, RAM (random access memory) 8, and a display part 9. The antenna 1 transmits and receives radio waves. The transmission/reception part 2 modulates voice or data into radio waves and transmits the radio waves through the antenna 1. Further, the transmission/reception part 2 receives radio waves through the antenna 1 and demodulates the received radio waves into voice or data. The control unit 3 controls the whole portable telephone. The operating part 4 includes a transmission button, a conversion button for English character/kana (the Japanese syllabary)/kanji (Chinese character)/numeral, an on/off button for a power supply, a cross-shaped button for cursor operation, and an end button. The transmission part 5 converts the user's voice to an electric signal. The reception part 6 transmits the voice obtained by the demodulation to the user. ROM 7 records a control program for operating the control unit 4 and further stores character information or illustration information for display on the display part 9. RAM 8 stores, for example, input data, for example, telephone directory and mail address data, generated by the operating part 4 and mails received in the transmission/reception part 2.

In this portable telephone, radio waves sent from a radio base station (not shown) are received in the transmission/reception part 2 through the antenna 1 and are demodulated into voice or data. The voice obtained by the demodulation is transmitted to the user through the reception part 6, and the data obtained by the demodulation is displayed on the display part 9. When the data obtained by the demodulation is a mail, the data is stored in RAM 8. When a telephone directory, a mail address or the like has been prepared in the operating part 4, the telephone directory or the mail address is stored in RAM 8. When a mail has been prepared in the operating part 4, the mail is transmitted to the radio base station through the transmission/reception part 2 and the antenna 1.

The above conventional portable telephone has the following problems.

The spread of portable telephones has led to a tendency toward an increase in the loss of portable telephones. This poses a problem that the telephone directory or mail address data stored in RAM 8 of the lost portable telephone are illegally used by a finder of the lost portable telephone and, consequently, for example, a mischief caused by using the data evilly takes place. A conventional measure for avoiding this problem is to call the lost portable telephone for asking the finder for the return of the found portable telephone to the user, or to ask the telephone company for the stop of communication function of the portable telephone. For example, in the case of TDMA (time division multiple access), upon the receipt of the request for the stop of the communication functions, the channel in a time zone allotted to the portable telephone, of which the communication functions should be stopped, is masked. When the stop of communication functions is requested to the telephone company, communication functions such as telephone or mail functions of the portable telephone can be stopped. Disadvantageously, however, telephone directory and mail address data stored in RAM 8 cannot be concealed. For this reason, at the present time, there are no useful measures for avoiding, for example, mischievous acts which use these data evilly.

SUMMARY OF THE INVENTION

Under the above circumstances, the invention has been made, and it is an object of the invention to provide a mobile communication terminal remote control system, a mobile communication terminal, a remote control method, and a remote control program, which can conceal telephone directory and mail address data stored in a mobile communication terminal under remote control without asking the telephone company for the concealment of these data.

The above object can be attained by the following features of the invention.

(1) A mobile communication terminal remote control system comprising a mobile communication terminal and a remote control device for performing predetermined remote control of the mobile communication terminal, said remote control device being configured to send, to the mobile communication terminal, remote control data for stopping a part or the whole of functions of the mobile communication terminal under remote control, said mobile communication terminal comprising: a storage part which previously stores remote control data for stopping a part or the whole of functions of its own terminal under remote control; a reception part for receiving the remote control data sent from the remote control device; a control unit which compares the remote control data stored in the storage part with the remote control data received in the reception part, judges whether or not the remote control data stored in the storage part are consistent with the remote control data received in the reception part, and stops a part or the whole of functions of its own terminal when said data have been judged to be consistent with each other; a first power supply part which supplies electric power to said reception part, said storage part, and said control unit and is detachable; and a second power supply part which, when the first power supply part has been discharged or removed, supplies electric power to said transmission/reception part, said storage part, and said control unit irrespective of whether the power supply of its own terminal is in on state or off state.

(2) A mobile communication terminal remote control system comprising a mobile communication terminal, a radio base station for communication with the mobile communication terminal in a small zone allotted to the radio base station, and a remote control device for performing predetermined remote control of the mobile communication terminal through the radio base station, said remote control device being configured to send, to the mobile communication terminal through the radio base station, remote control data for stopping a part of functions of the mobile communication terminal under remote control, said mobile communication terminal comprising: a first storage part which previously stores remote control data for stopping a part or the whole of functions of its own terminal under remote control; a second storage part which stores information which the user of the mobile communication terminal desires to conceal; a reception part for receiving the remote control data sent from the remote control device through the radio base station; a control unit which compares the remote control data stored in the first storage part with the remote control data received in the reception part, judges whether or not the remote control data stored in the first storage part are consistent with the remote control data received in the reception part, and masks the desired information to be concealed stored in the second storage part when said data have been judged to be consistent with each other; a first power supply part which supplies electric power to said reception part, said first storage part, said second storage part, and said control unit and is detachable; and a second power supply part which, when the first power supply part has been discharged or removed, supplies electric power to said transmission/reception part, said storage parts, and said control unit irrespective of whether the power supply of its own terminal is in on state or off state.

(3) The mobile communication terminal remote control system according to the above item (1) or (2), wherein said remote control data include a mail sender address representing a network address of the remote control device, a subject of a mail to be sent by the user from the remote control device, and a password set by the user.

(4) The mobile communication terminal remote control system according to the above item (1) or (2), wherein the remote control data can be arbitrarily changed by the user of the mobile communication terminal.

(5) The mobile communication terminal remote control system according to the above item (1) or (2), wherein the remote control device is configured to encrypt the remote control data before the transmission of the data and the control unit of the mobile communication terminal is configured to decode the encrypted remote control data sent from the remote control device.

(6) The mobile communication terminal remote control system according to the above item (1) or (2), wherein said second power supply part is not detachable.

(7) A mobile communication terminal of which the functions are partially or wholly stopped upon the receipt of remote control data sent from a remote control device, said mobile communication terminal comprising: a storage part which previously stores said remote control data; a reception part for receiving the remote control data sent from the remote control device; a control unit which compares the remote control data stored in the storage part with the remote control data received in the reception part, judges whether or not the remote control data stored in the storage part are consistent with the remote control data received in the reception part, and stops a part or the whole of functions of its own terminal when said data have been judged to be consistent with each other; a first power supply part which supplies electric power to said reception part, said storage part, and said control unit and is detachable; and a second power supply part which, when the first power supply part has been discharged or removed, supplies electric power to said transmission/reception part, said storage part, and said control unit irrespective of whether the power supply of its own terminal is in on state or off state.

(8) A mobile communication terminal of which the functions are partially stopped upon the receipt of remote control data sent from a remote control device through a radio base station, said mobile communication terminal comprising: a first storage part which previously stores said remote control data; a second storage part which stores information which the user of the mobile communication terminal desires to conceal; a reception part for receiving the remote control data sent from the remote control device through the radio base station; a control unit which compares the remote control data stored in the first storage part with the remote control data received in the reception part, judges whether or not the remote control data stored in the first storage part are consistent with the remote control data received in the reception part, and masks the desired information to be concealed stored in the second storage part when said data have been judged to be consistent with each other; a first power supply part which supplies electric power to said reception part, said first storage part, said second storage part, and said control unit and is detachable; and a second power supply part which, when the first power supply part has been discharged or removed, supplies electric power to said transmission/reception part, said storage parts, and said control unit irrespective of whether the power supply of its own terminal is in on state or off state.

(9) The mobile communication terminal according to the above item (7) or (8), wherein said remote control data include a mail sender address representing a network address of the remote control device, a subject of a mail to be sent by the user from the remote control device, and a password set by the user.

(10) The mobile communication terminal according to the above item (7) or (8), wherein the remote control data can be arbitrarily changed by the user of the mobile communication terminal.

(11) The mobile communication terminal according to the above item (7) or (8), wherein the remote control device is configured to encrypt the remote control data before the transmission of the data and the control unit of the mobile communication terminal is configured to decode the encrypted remote control data sent from the remote control device.

(12) The mobile communication terminal according to the above item (7) or (8), wherein said second power supply part is not detachable.

(13) A remote control method comprising the steps of: providing a mobile communication terminal remote control system comprising a mobile communication terminal and a remote control device for performing predetermined remote control of the mobile communication terminal; in said mobile communication terminal, previously storing remote control data for stopping a part or the whole of functions of its own terminal under remote control (storing processing); sending by said remote control device, to said mobile communication terminal, remote control data for stopping a part or the whole of functions of the mobile communication terminal under remote control (remote control data transmission processing); in said mobile communication terminal, receiving the remote control data sent from the remote control device (remote control data reception processing); and, in said mobile communication terminal, comparing the remote control data stored in said storing processing with the remote control data received in said reception part, judging whether or not the remote control data stored in said storing processing are consistent with the remote control data received in said reception part, and stopping a part or the whole of functions of its own terminal when said data have been judged to be consistent with each other (function stopping processing).

(14) A remote control method comprising the steps of: providing a mobile communication terminal remote control system comprising a mobile communication terminal, a radio base station for communication with the mobile communication terminal in a small zone allotted to the radio base station, and a remote control device for performing predetermined remote control of the mobile communication terminal through the radio base station; in said mobile communication terminal, previously storing remote control data for stopping a part or the whole of functions of its own terminal under remote control (first storing processing); sending by said remote control device, to said mobile communication terminal through said radio base station, remote control data for stopping a part of functions of the mobile communication terminal under remote control (remote control data transmission processing); in said mobile communication terminal, storing information which the user of the mobile communication terminal desires to conceal (second storing processing); in said mobile communication terminal, receiving the remote control data sent from the remote control device through said radio base station (remote control data reception processing); and, in said mobile communication terminal, comparing the remote control data stored in said first storing processing with the remote control data received in the reception part, judging whether or not the remote control data stored in said first storing processing are consistent with the remote control data received in the reception part, and masking the desired information to be concealed stored in said second storing processing when said data have been judged to be consistent with each other (masking processing).

(15) The remote control method according to the above item (13) or (14), wherein said remote control data include a mail sender address representing a network address of the remote control device, a subject of a mail to be sent by the user from the remote control device, and a password set by the user.

(16) The remote control method according to the above item (13) or (14), wherein the remote control data can be arbitrarily changed by the user of the mobile communication terminal.

(17) The remote control method according to the above item (13) or (14), wherein, in said remote control data transmission processing, the remote control device encrypts the remote control data before the transmission of the data and, in said remote control data reception processing, the control unit of the mobile communication terminal decodes the encrypted remote control data sent from the remote control device.

(18) A remote control program comprising a program stored in a computer to allow said computer to realize the function of the mobile communication terminal remote control system according to the above item (1) or (2).

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 1:
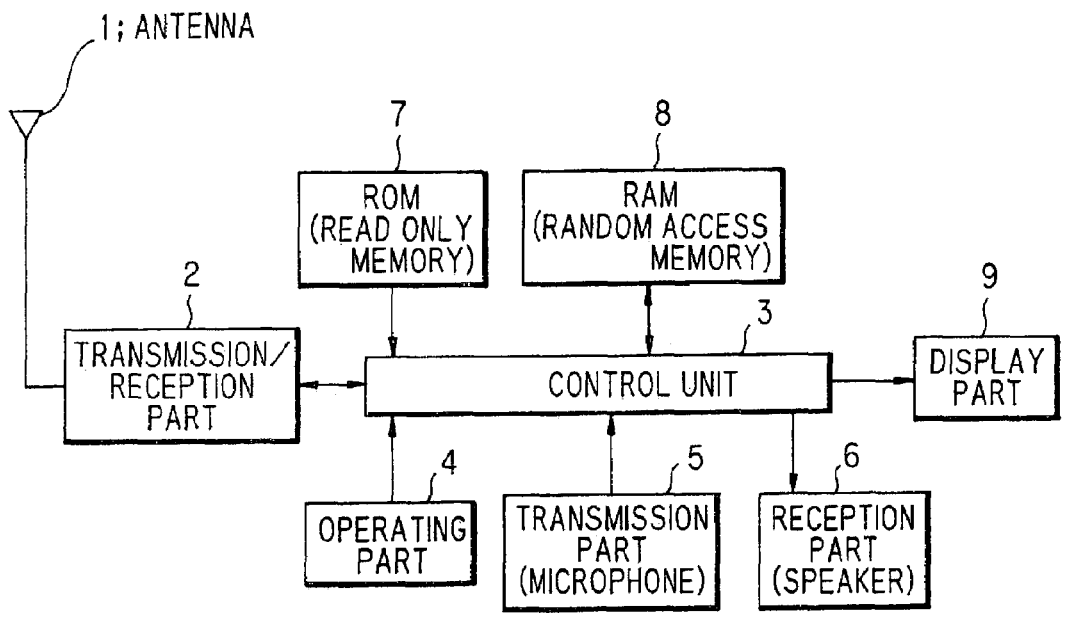
FIG. 1 is a block diagram showing the electric construction of a conventional portable telephone.
Figure 2:
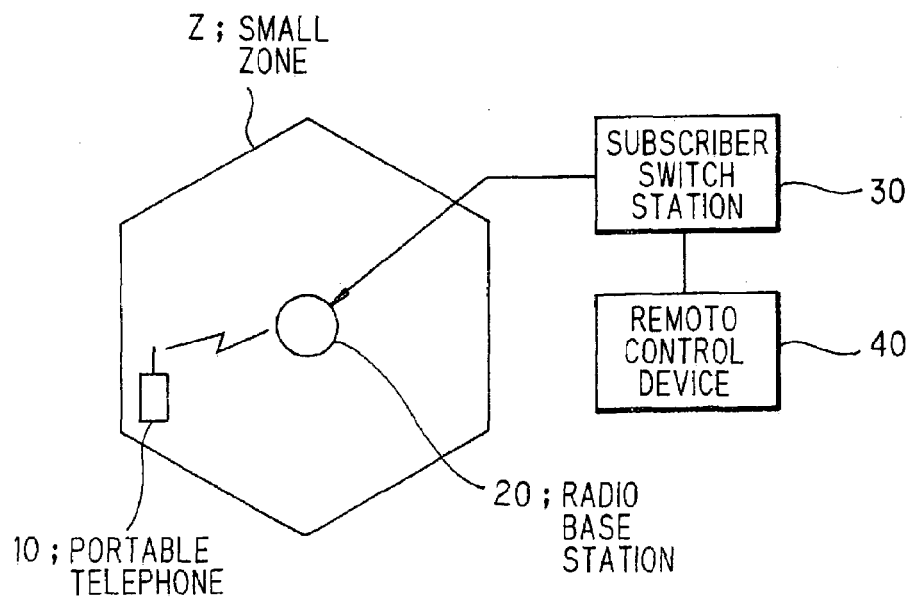
FIG. 2 is a block diagram showing the electric construction of a mobile communication terminal remote control system in a preferred embodiment of the invention.

FIG. 2 is a block diagram showing the electric construction of a mobile communication terminal remote control system in a preferred embodiment of the invention.

As shown in FIG. 2, the mobile communication terminal remote control system in this preferred embodiment comprises a portable telephone 10, a radio base station 20, a subscriber switch station 30, and a remote control device 40. The radio base station 20 functions to communicate with the portable telephone 10 in a small zone Z allotted to the radio base station 20. Within a position registration area allotted to the subscriber switch station 30, the subscriber switch station 30 always grasps the position of a portable telephone 10 located in the small zone Z allotted to the radio base station 20, performs position registration of the portable telephone 10, and further communicates with the portable telephone 10 through the radio base station 20. The remote control device 40 comprises, for example, a portable telephone or a personal computer and performs predetermined remote control of the portable telephone 10 through the subscriber switch station 30 and the radio base station 20. In particular, in this preferred embodiment, the remote control device 40 sends, to the portable telephone 10, remote control data for stopping a part of functions of the portable telephone 10 under remote control through the subscriber switch station 30 and the radio base station 20.

Figure 3:
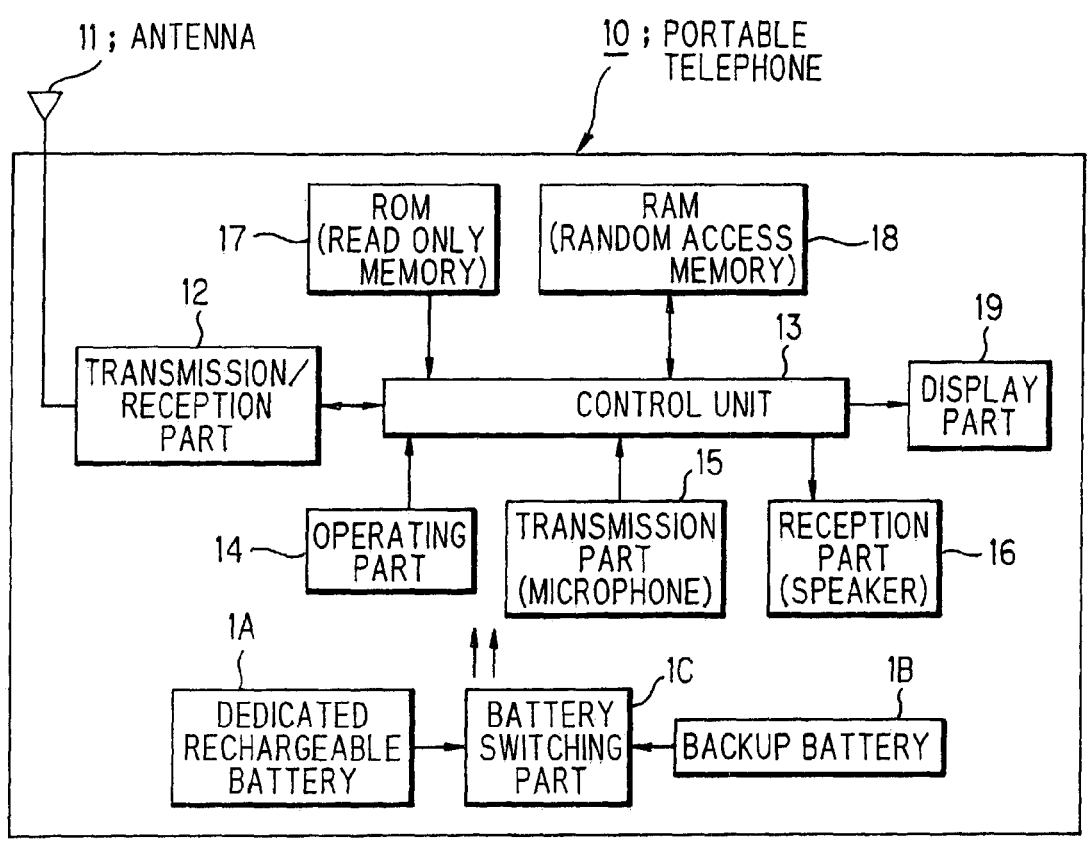
FIG. 3 is a schematic block diagram showing the electric construction of the portable telephone shown in FIG. 2.

FIG. 3 is a schematic block diagram showing the electric construction of the portable telephone 10 shown in FIG. 2.

This portable telephone 10 includes an antenna 11, a transmission/reception part 12, a control unit 13, an operating part 14, a transmission part (a microphone) 15, a reception part (a speaker) 16, ROM 17, RAM 18, a display part 19, a dedicated rechargeable battery 1A, a backup battery 1B, and a battery switching part 1C. The antenna 11 transmits and receives radio waves. The transmission/reception part 12 modulates voice or data into radio waves and transmits the radio waves through the antenna 11 to the radio base station 20. Further, the transmission/reception part 12 receives radio waves through the antenna 11 and demodulates the radio waves into voice or data. In this preferred embodiment, the transmission/reception part 12 receives remote control data sent from the remote control device 40 through the subscriber switch station 30 and the radio base station 20.

The operating part 14 includes a transmission button, a conversion button for English character/kana (the Japanese syllabary)/kanji (Chinese character)/numeral, an on/off button for a power supply, a cross-shaped button for cursor operation, and an end button. The transmission part 15 converts the user's voice to an electric signal. The reception part 16 transmits the voice obtained by the demodulation to the user. ROM 17 records a remote control program for operating the control unit 14 and further stores character information or illustration information for display on the display part 19. Further, in ROM 17, remote control data for stopping a part of functions of the portable telephone 10 under remote control have been previously stored. The remote control data include, for example, a mail sender address representing a network address of the remote control device 40, a subject of a mail to be sent by the user from the remote control device 40, and a password set by the user. The remote control data may be arbitrarily changed by the user. RAM 18 stores information which the user desires to conceal, for example, input data generated by the operating part 14, such as telephone directory and mail address data, and mails received in the transmission/reception part 12.

The control unit 13 includes CPU (central processing unit). The control unit 13 controls the whole portable telephone. Further, the control unit 13 compares the remote control data stored in ROM 17 with the remote control data received in the transmission/reception part 12, and judges whether or not the remote control data stored in ROM 17 are consistent with the remote control data received in the transmission/reception part 12. When these data have been judged to be consistent with each other, the control unit 13 masks the desired information to be concealed stored in RAM 18. The display part 19 includes, for example, LCD (liquid crystal display) or EL (electro luminescence). The dedicated rechargeable battery 1A is a detachable rechargeable battery, which has been prepared for use in the portable telephone 10 only, and supplies electric power to each part provided within the portable telephone 10. The backup battery 1B is built in the portable telephone 10 and is not detachable. The battery switching part 1C detects the discharge or removal of the dedicated rechargeable battery 1A and supplies electromotive force of the backup battery 1B to each part provided within the portable telephone 10 irrespective of whether the power supply of the portable telephone 10 is in on state or off state.

Figure 4:
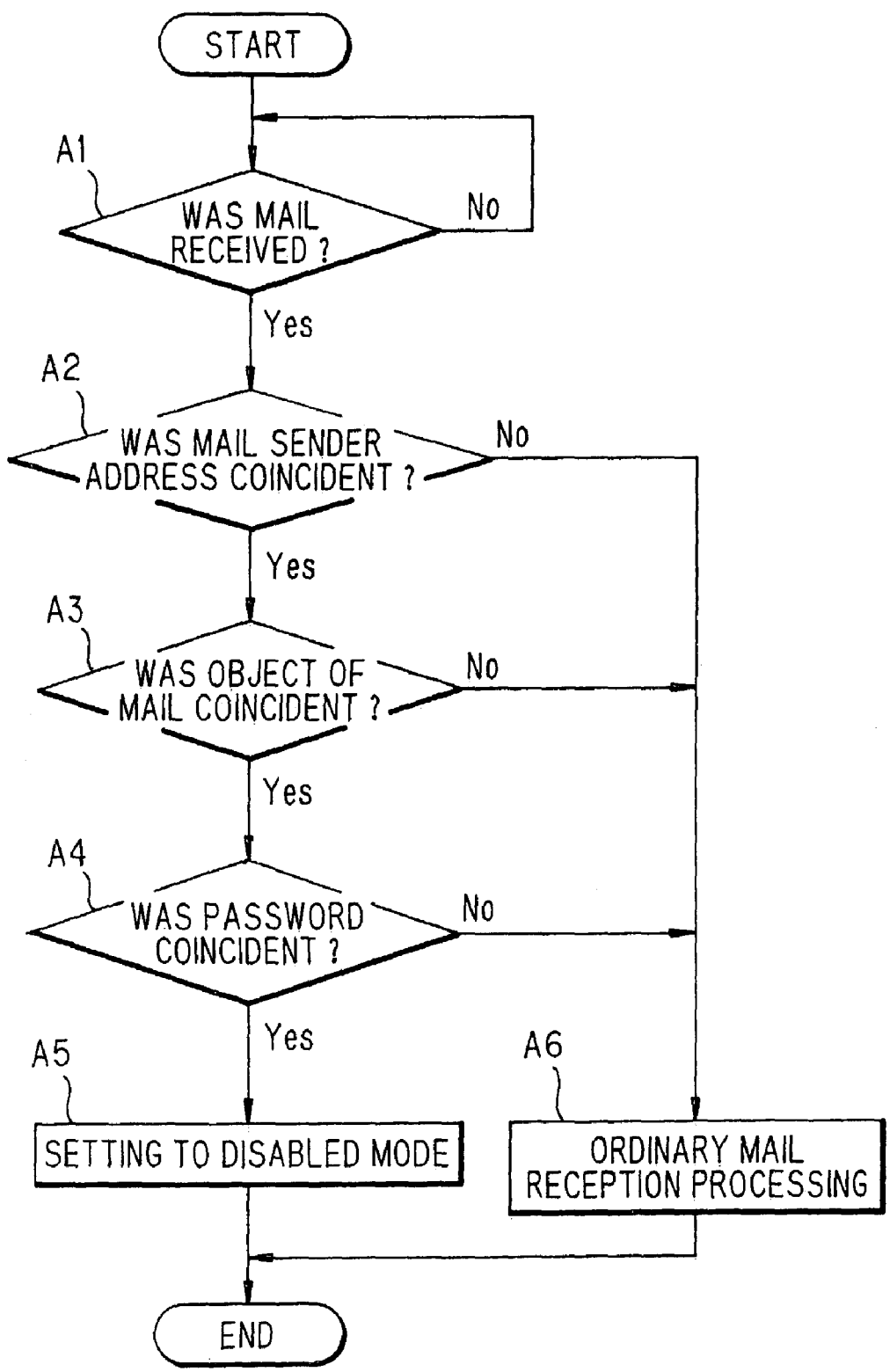
FIG. 4 is a flow chart illustrating the operation of the mobile communication terminal remote control system shown in FIG. 2.

FIG. 4 is a flow chart illustrating the operation of the mobile communication terminal remote control system shown in FIG. 2.

The contents of processing involved in a remote control method applied to the mobile communication terminal remote control system in this preferred embodiment will be explained in conjunction with FIG. 4.

In the portable telephone 10, radio waves sent from the radio base station 20 are received in the transmission/reception part 12 through the antenna 11 and are demodulated into voice or data. The voice obtained by the demodulation is transmitted to the user through the reception part 16. The data obtained by the demodulation are displayed on the display part 19. When the data obtained by the demodulation are mail data, the data are stored in RAM 18. In consideration of the loss or stealing of the portable telephone 10, the user inputs remote control data by operating the operating part 14. The remote control data are stored in ROM 17 (first storing processing). When user's desired information to be concealed, such as telephone directory and mail address data, has been prepared in the operating part 14, the information is stored in RAM 18 (second storing processing). When a mail has been prepared in the operating part 14, the mail is sent through the transmission/reception part 12 and the antenna 11 to the radio base station 20.

For example, when the portable telephone 10 has been lost and, due to this loss, when the user wishes to stop the operation of the portable telephone 10, the user operates the remote control device 40 to send remote control data, for stopping a part of functions of the portable telephone 10 under remote control, to the portable telephone 10 through the subscriber switch station 30 and the radio base station 20 (remote control data transmission processing). The remote control data (mail) sent from the remote control device 40 through the subscriber switch station 30 and the radio base station 20 to the portable telephone 10 are received in the transmission/reception part 12 of the portable telephone 10 (step A1, remote control data reception processing). The control unit 13 compares the remote control data stored in ROM 17 by the first storing processing with the remote control data received in the transmission/reception part 12 and judges whether or not these data are consistent with each other.

In this case, a judgment is made on whether or not the mail sender address in the remote control data stored in ROM 17 is consistent with the mail sender address in the remote control data received in the transmission/reception part 12 (step A2). When these mail sender addresses have been judged to be inconsistent with each other, ordinary mail reception processing is carried out (step A6). On the other hand, when these mail sender addresses have been judged to be consistent with each other, the step is transferred to step A3 where a judgment is made on whether or not the subject of the mail in the remote control data stored in ROM 17 is consistent with the subject of the mail in the remote control data received in the transmission/reception part 12. When these subjects have been judged to be inconsistent with each other, ordinary mail reception processing is carried out (step A6).

On the other hand, when these subjects have been judged to be consistent with each other, the step is transferred to step A4 where a judgment is made on whether or not the password in the remote control data stored in ROM 17 is consistent with the password in the remote control data received in the transmission/reception part 12. When these passwords have been judged to be inconsistent with each other, ordinary mail reception processing is carried out (step A6). On the other hand, when these passwords have been judged to be consistent with each other, the desired information to be concealed stored in RAM 18 by the second storing processing is masked, followed by setting to a disabled mode (step A5, masking processing).

When the dedicated rechargeable battery 1A has been discharged or removed by a finder or the like, this fact is detected by the battery switching part 1C and the electromotive force of the backup battery 1B is supplied to each part provided within the portable telephone 10. Thereafter, the same processings as described above are carried out.

As is apparent from the foregoing description, in this preferred embodiment, the control unit 13 in the portable telephone 10 compares the remote control data stored in ROM 17 with the remote control data received in the transmission/reception part 12 to judge whether or not these data are consistent with each other. When these data have been judged to be consistent with each other, the desired information to be concealed stored in RAM 18 is masked. Therefore, even when the portable telephone 10 has been lost or stolen, the desired information to be concealed can be protected under remote control. Further, this remote control uses a mail transmission/reception function provided as a standard function on current portable telephones and thus can be realized without construction of any special system.

The invention has been described in detail with particular reference to preferred embodiments in conjunction with the accompanying drawings, but it will be understood that variations and modifications can be effected within the scope of the invention as set forth in the appended claims.

For example, the mobile communication terminal is not limited to the portable telephone 10 and may be, for example, land mobile radiotelephones or PDA (personal digital assistants) including functions of the portable telephone. Further, the remote control device 40 may be configured to encrypt the remote control data before the transmission of the data, and the control unit 13 of the portable telephone 10 may be configured to decode the encrypted remote control data sent from the remote control device 40.

As described above, according to the invention, remote control data are sent from a remote control device to a portable telephone in which remote control data have been previously stored. The portable telephone in its control unit compares the received remote control data with the previously stored remote control data to judge whether or not these data are consistent with each other. When these data have been judged to be consistent with each other, a part or the whole of functions of the portable telephone is stopped. For example, in the portable telephone, a construction may be adopted wherein remote control data are previously stored in a first storage part, and information, which the user of the portable telephone desired to conceal, is stored in a second storage part. In this construction, when the remote control data received from the remote control device have been judged to be consistent with the remote control data previously stored in the first storage part, the desired information to be concealed can be masked. Therefore, even when the mobile communication terminal has been lost or stolen, the desired information to be concealed can be protected under remote control. Further, this remote control uses a mail transmission/reception function provided as a standard function on current mobile communication terminals, such as current portable telephones, and thus can be realized without construction of any special system.

What is claimed is:

1. A mobile communication terminal remote control system comprising
   a mobile communication terminal and
   a remote control device for performing predetermined remote control of the mobile communication terminal,
   said remote control device being configured to send, to the mobile communication terminal, remote control data for stopping at least some part of functions of the mobile communication terminal,
   said mobile communication terminal comprising:
   a storage part which previously stores remote control data for stopping at least some part of functions of the mobile communication terminal;
   a reception part for receiving the remote control data sent from the remote control device;
   a control unit which compares the remote control data stored in the storage part with the remote control data received in the reception part, judges whether or not the remote control data stored in the storage part are consistent with the remote control data received in the reception part, and stops at least some part of functions of the mobile communication terminal when said remote control data stored in the storage part and the remote control data received in the reception part have been judged to be consistent with each other;
   a first power supply part which supplies electric power to said reception part, said storage part, and said control unit; and
   a second power supply part which, when the first power supply part has been discharged or removed, supplies electric power to said transmission/reception part, said storage part, and said control unit irrespective of whether the mobile communication terminal is in an on state or an off state.

2. The mobile communication terminal remote control system according to claim 1, wherein
   said remote control data include a mail sender address representing a network address of the remote control device, a subject of a mail to be sent by the user from the remote control device, and a password set by the user.

3. The mobile communication terminal remote control system according to claim 1, wherein
   the remote control data can be arbitrarily changed by the user of the mobile communication terminal.

4. The mobile communication terminal remote control system according to claim 1, wherein
   the remote control device is configured to encrypt the remote control data before the transmission of the data, and
   the control unit of the mobile communication terminal is configured to decode the encrypted remote control data sent from the remote control device.

5. The mobile communication terminal remote control system according to claim 1, wherein:
   said first power supply part is detachable; and
   said second power supply part is not detachable.

6. A remote control program comprising a program stored in a computer to allow said computer to realize the function of the mobile communication terminal remote control system according to claim 1.

7. A mobile communication terminal remote control system comprising
   a mobile communication terminal,
   a radio base station for communication with the mobile communication terminal in a zone allotted to the radio base station, and
   a remote control device for performing predetermined remote control of the mobile communication terminal through the radio base station,
   said remote control device being configured to send, to the mobile communication terminal through the radio base station, remote control data for stopping a part of functions of the mobile communication terminal,
   said mobile communication terminal comprising:
   a first storage part which previously stores remote control data for stopping a part of functions of the mobile communication terminal;
   a second storage part which stores information which the user of the mobile communication terminal to be concealed;
   a reception part for receiving the remote control data sent from the remote control device through the radio base station;
   a control unit which compares the remote control data stored in the first storage part with the remote control data received in the reception part, judges whether or not the remote control data stored in the first storage part are consistent with the remote control data received in the reception part, and masks the desired information to be concealed stored in the second storage part when the remote control data stored in the first storage part and the remote control data received in the reception part have been judged to be consistent with each other;

a first power supply part which supplies electric power to said reception part, said first storage part, said second storage part, and said control unit; and a second power supply part which, when the first power supply part has been discharged or removed, supplies electric power to said transmission/reception part, said storage parts, and said control unit irrespective of whether mobile communication terminal is in an on state or an off state.

8. The mobile communication terminal remote control system according to claim 7, wherein said remote control data include a mail sender address representing a network address of the remote control device, a subject of a mail to be sent by the user from the remote control device, and a password set by the user.

9. The mobile communication terminal remote control system according to claim 7, wherein the remote control data can be arbitrarily changed by the user of the mobile communication terminal.

10. The mobile communication terminal remote control system according to claim 7, wherein the remote control device is configured to encrypt the remote control data before the transmission of the data, and the control unit of the mobile communication terminal is configured to decode the encrypted remote control data sent from the remote control device.

11. The mobile communication terminal remote control system according to claim 7, wherein:

said first power supply part is detachable; and
said second power supply part is not detachable.

12. A remote control program comprising a program stored in a computer to allow said computer to realize the function of the mobile communication terminal remote control system according to claim 7.

13. A mobile communication terminal of which the functions are partially or wholly stopped upon the receipt of remote control data sent from a remote control device, said mobile communication terminal comprising:

a storage part which previously stores remote control data;

a reception part for receiving the remote control data sent from the remote control device;

a control unit which compares the remote control data stored in the storage part with the remote control data received in the reception part, judges whether or not the remote control data stored in the storage part are consistent with the remote control data received in the reception part, and stops at least part of functions of the mobile communication terminal when said remote control data stored in the storage part and the remote control data received in the reception part have been judged to be consistent with each other;

a first power supply part which supplies electric power to said reception part, said storage part, and said control unit; and a second power supply part which, when the first power supply part has been discharged or removed, supplies electric power to said transmission/reception part, said storage part, and said control unit irrespective of whether the mobile communication terminal is in an on state or an off state.

14. The mobile communication terminal according to claim 13, wherein said remote control data include a mail sender address representing a network address of the remote control device, a subject of a mail to be sent by the user from the remote control device, and a password set by the user.

15. The mobile communication terminal according to claim 13, wherein the remote control data can be arbitrarily changed by the user of the mobile communication terminal.

16. The mobile communication terminal according to claim 13, wherein the remote control device is configured to encrypt the remote control data before the transmission of the data, and the control unit of the mobile communication terminal is configured to decode the encrypted remote control data sent from the remote control device.

17. The mobile communication terminal according to claim 13, wherein said first power supply part is detachable; and
said second power supply part is not detachable.

18. A mobile communication terminal of which the functions are partially stopped upon the receipt of remote control data sent from a remote control device through a radio base station, said mobile communication terminal comprising:

a first storage part which previously stores remote control data;

a second storage part which stores information to be concealed;

a reception part for receiving the remote control data sent from the remote control device through the radio base station;

a control unit which compares the remote control data stored in the first storage part with the remote control data received in the reception part, judges whether or not the remote control data stored in the first storage part are consistent with the remote control data received in the reception part, and the desired information to be concealed stored in the second storage part when said remote control data stored in the first storage part and the remote control data received in the reception part have been judged to be consistent with each other;

a first power supply part which supplies electric power to said reception part, said first storage part, said second storage part, and said control unit; and a second power supply part which, when the first power supply part has been discharged or removed, supplies electric power to said transmission/reception part, said storage parts, and said control unit irrespective of whether the mobile communication terminal is in an on state or an off state.

19. The mobile communication terminal according to claim 18, wherein said remote control data include a mail sender address representing a network address of the remote control device, a subject of a mail to be sent by the user from the remote control device, and a password set by the user.

20. The mobile communication terminal according to claim 18, wherein the remote control data can be arbitrarily changed by the user of the mobile communication terminal.

21. The mobile communication terminal according to claim 18, wherein
the remote control device is configured to encrypt the remote control data before the transmission of the data, and
the control unit of the mobile communication terminal is configured to decode the encrypted remote control data sent from the remote control device.

22. The mobile communication terminal according to claim 18, wherein
said first power supply part is detachable; and
said second power supply part is not detachable.

23. A remote control method comprising the steps of:
providing a mobile communication terminal remote control system comprising a mobile communication terminal and a remote control device for performing predetermined remote control of the mobile communication terminal;
in said mobile communication terminal, previously storing remote control data for stopping a part or the whole of functions of the mobile communication terminal (storing processing);
sending by said remote control device, to said mobile communication terminal, remote control data for stopping a part or the whole of functions of the mobile communication terminal (remote control data transmission processing);
in said mobile communication terminal, receiving the remote control data sent from the (remote control data reception processing); and
in said mobile communication terminal, comparing the remote control data stored in said storing processing with the remote control data received in said reception part, judging whether or not the remote control data stored in said storing processing are consistent with the remote control data received in said reception part, and stopping a part or the whole of functions of the mobile communication terminal when said data have been judged to be consistent with each other (function stopping processing);
wherein the remote control data can be arbitrarily changed by the user of the mobile communication terminal.

24. The remote control method according to claim 23, wherein
said remote control data include a mail sender address representing a network address of the remote control device, a subject of a mail to be sent by the user from the remote control device, and a password set by the user.

25. The remote control method according to claim 23, wherein
in said remote control data transmission processing, the remote control device encrypts the remote control data before the transmission of the data and
in said remote control data reception processing, the control unit of the mobile communication terminal decodes the encrypted remote control data sent from the remote control device.

26. A remote control method comprising the steps of:
providing a mobile communication terminal remote control system comprising a mobile communication terminal, a radio base station for communication with the mobile communication terminal in a small zone allotted to the radio base station, and a remote control device for performing predetermined remote control of the mobile communication terminal through the radio base station;
in said mobile communication terminal, previously storing remote control data for stopping a part or the whole of functions of the mobile communication terminal (first storing processing);
sending by said remote control device, to said mobile communication terminal through said radio base station, remote control data for stopping a part of functions of the mobile communication terminal (remote control data transmission processing);
in said mobile communication terminal, storing information which the user of the mobile communication terminal desires to conceal (second storing processing);
in said mobile communication terminal, receiving the remote control data sent from the remote control device through said radio base station (remote control data reception processing); and
in said mobile communication terminal, comparing the remote control data stored in said first storing processing with the remote control data received in the reception part, judging whether or not the remote control data stored in said first storing processing are consistent with the remote control data received in the reception part, and masking the desired information to be concealed stored in said second storing processing when said data have been judged to be consistent with each other (masking processing).

27. The remote control method according to claim 26, wherein
said remote control data include a mail sender address representing a network address of the remote control device, a subject of a mail to be sent by the user from the remote control device, and a password set by the user.

28. The remote control method according to claim 26, wherein
the remote control data can be arbitrarily changed by the user of the mobile communication terminal.

29. The remote control method according to claim 26, wherein
in said remote control data transmission processing, the remote control device encrypts the remote control data before the transmission of the data and
in said remote control data reception processing, the control unit of the mobile communication terminal decodes the encrypted remote control data sent from the remote control device.

* * * * *